(12) United States Patent
Bowden, Jr. et al.

(10) Patent No.: US 10,682,821 B2
(45) Date of Patent: Jun. 16, 2020

(54) FLEXIBLE TOOLING SYSTEM AND METHOD FOR MANUFACTURING OF COMPOSITE STRUCTURES

(71) Applicant: DIVERGENT TECHNOLOGIES, INC., Los Angeles, CA (US)

(72) Inventors: Thomas Samuel Bowden, Jr., Los Angeles, CA (US); Jon Paul Gunner, Palos Verdes Estates, CA (US); Antonio Bernerd Martinez, El Segundo, CA (US); Ian Hawthorn Ashdown, San Clemente, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 15/968,510

(22) Filed: May 1, 2018

(65) Prior Publication Data

US 2019/0337245 A1 Nov. 7, 2019

(51) Int. Cl.
| | | |
|---|---|---|
| *B29C 70/54* | (2006.01) | |
| *B29C 64/10* | (2017.01) | |
| *B29C 70/30* | (2006.01) | |
| *B22F 3/00* | (2006.01) | |
| *B29C 33/38* | (2006.01) | |
| *B33Y 80/00* | (2015.01) | |
| *B22F 3/105* | (2006.01) | |
| *B22F 3/24* | (2006.01) | |
| *B29C 33/40* | (2006.01) | |

(Continued)

(52) U.S. Cl.
CPC .............. *B29C 70/54* (2013.01); *B22F 3/008* (2013.01); *B29C 33/3842* (2013.01); *B29C 64/10* (2017.08); *B29C 70/30* (2013.01); *B29C 70/545* (2013.01); *B33Y 80/00* (2014.12); *B29K 2307/04* (2013.01)

(58) Field of Classification Search
CPC ........ B29C 33/308; B29C 70/38; B29C 33/52
USPC ........................................... 156/242
See application file for complete search history.

(56) References Cited

U.S. PATENT DOCUMENTS 4,869,770 A * 9/1989 Christensen ............ B29C 33/30
156/286
5,203,226 A 4/1993 Hongou et al.
(Continued)

FOREIGN PATENT DOCUMENTS

DE 10342867 A1 * 4/2005 ......... B29C 33/3842
DE 102016103616 A1 * 9/2016 ......... B29C 33/0011
(Continued)

OTHER PUBLICATIONS

US 9,202,136 B2, 12/2015, Schmidt et al. (withdrawn)
(Continued)

*Primary Examiner* — Sing P Chan
(74) *Attorney, Agent, or Firm* — Arent Fox LLP (57) ABSTRACT

A system and method is provided for manufacturing a composite structure. In an exemplary aspect, the system includes multiple flexible tooling plates that are interlocked to each other to form a tooling surface for forming a composite structure to be manufactured. Moreover, the system includes an actuator array connected to the flexible plates and that can move the flexible plates relative to each other to adjust a contour of the tooling surface to correspond to a design contour of the composite structure to be manufactured.

18 Claims, 6 Drawing Sheets

(51) Int. Cl.
  *B29C 33/56*  (2006.01)
  *B29C 33/30*  (2006.01)
  *B22F 7/06*  (2006.01)
  *B33Y 10/00*  (2015.01)
  *B29C 64/00*  (2017.01)
  *B33Y 30/00*  (2015.01)
  *B29K 307/04*  (2006.01)

(56) References Cited

U.S. PATENT DOCUMENTS

| | | |
|---|---|---|
| 5,380,978 A | 1/1995 | Pryor |
| 5,742,385 A | 4/1998 | Champa |
| 5,819,388 A | 10/1998 | Salm |
| 5,990,444 A | 11/1999 | Costin |
| 6,010,155 A | 1/2000 | Rinehart |
| 6,096,249 A | 8/2000 | Yamaguchi |
| 6,140,602 A | 10/2000 | Costin |
| 6,250,533 B1 | 6/2001 | Otterbein et al. |
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,057,206 B1 * | 11/2011 | McKnight .......... B29C 33/0011 249/161 |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |

(56) References Cited

U.S. PATENT DOCUMENTS

| | | | |
|---|---|---|---|
| 9,789,922 | B2 | 10/2017 | Dosenbach et al. |
| 9,796,137 | B2 | 10/2017 | Zhang et al. |
| 9,802,108 | B2 | 10/2017 | Aders |
| 9,809,977 | B2 | 11/2017 | Carney et al. |
| 9,817,922 | B2 | 11/2017 | Glunz et al. |
| 9,818,071 | B2 | 11/2017 | Jung et al. |
| 9,821,339 | B2 | 11/2017 | Paschkewitz et al. |
| 9,821,411 | B2 | 11/2017 | Buller et al. |
| 9,823,143 | B2 | 11/2017 | Twelves, Jr. et al. |
| 9,829,564 | B2 | 11/2017 | Bruder et al. |
| 9,846,933 | B2 | 12/2017 | Yuksel |
| 9,854,828 | B2 | 1/2018 | Langeland |
| 9,858,604 | B2 | 1/2018 | Apsley et al. |
| 9,862,833 | B2 | 1/2018 | Hasegawa et al. |
| 9,862,834 | B2 | 1/2018 | Hasegawa et al. |
| 9,863,885 | B2 | 1/2018 | Zaretski et al. |
| 9,870,629 | B2 | 1/2018 | Cardno et al. |
| 9,879,981 | B1 | 1/2018 | Dehghan Niri et al. |
| 9,884,663 | B2 | 2/2018 | Czinger et al. |
| 9,898,776 | B2 | 2/2018 | Apsley et al. |
| 9,914,150 | B2 | 3/2018 | Pettersson et al. |
| 9,919,360 | B2 | 3/2018 | Buller et al. |
| 9,931,697 | B2 | 4/2018 | Levin et al. |
| 9,933,031 | B2 | 4/2018 | Bracamonte et al. |
| 9,933,092 | B2 | 4/2018 | Sindelar |
| 9,957,031 | B2 | 5/2018 | Golshany et al. |
| 9,958,535 | B2 | 5/2018 | Send et al. |
| 9,962,767 | B2 | 5/2018 | Buller et al. |
| 9,963,978 | B2 | 5/2018 | Johnson et al. |
| 9,971,920 | B2 | 5/2018 | Derakhshani et al. |
| 9,976,063 | B2 | 5/2018 | Childers et al. |
| 9,987,792 | B2 | 6/2018 | Flitsch et al. |
| 9,988,136 | B2 | 6/2018 | Tiryaki et al. |
| 9,989,623 | B2 | 6/2018 | Send et al. |
| 9,990,565 | B2 | 6/2018 | Rhoads et al. |
| 9,994,339 | B2 | 6/2018 | Colson et al. |
| 9,996,890 | B1 | 6/2018 | Cinnamon et al. |
| 9,996,945 | B1 | 6/2018 | Holzer et al. |
| 10,002,215 | B2 | 6/2018 | Dowski et al. |
| 10,006,156 | B2 | 6/2018 | Kirkpatrick |
| 10,011,089 | B2 | 7/2018 | Lyons et al. |
| 10,011,685 | B2 | 7/2018 | Childers et al. |
| 10,012,532 | B2 | 7/2018 | Send et al. |
| 10,013,777 | B2 | 7/2018 | Mariampillai et al. |
| 10,015,908 | B2 | 7/2018 | Williams et al. |
| 10,016,852 | B2 | 7/2018 | Broda |
| 10,016,942 | B2 | 7/2018 | Mark et al. |
| 10,017,384 | B1 | 7/2018 | Greer et al. |
| 10,018,576 | B2 | 7/2018 | Herbsommer et al. |
| 10,022,792 | B2 | 7/2018 | Srivas et al. |
| 10,022,912 | B2 | 7/2018 | Kia et al. |
| 10,027,376 | B2 | 7/2018 | Sankaran et al. |
| 10,029,415 | B2 | 7/2018 | Swanson et al. |
| 10,040,239 | B2 | 8/2018 | Brown, Jr. |
| 10,046,412 | B2 | 8/2018 | Blackmore |
| 10,048,769 | B2 | 8/2018 | Selker et al. |
| 10,052,712 | B2 | 8/2018 | Blackmore |
| 10,052,820 | B2 | 8/2018 | Kemmer et al. |
| 10,055,536 | B2 | 8/2018 | Maes et al. |
| 10,058,764 | B2 | 8/2018 | Aders |
| 10,058,920 | B2 | 8/2018 | Buller et al. |
| 10,061,906 | B2 | 8/2018 | Nilsson |
| 10,065,270 | B2 | 9/2018 | Buller et al. |
| 10,065,361 | B2 | 9/2018 | Susnjara et al. |
| 10,065,367 | B2 | 9/2018 | Brown, Jr. |
| 10,068,316 | B1 | 9/2018 | Holzer et al. |
| 10,071,422 | B2 | 9/2018 | Buller et al. |
| 10,071,525 | B2 | 9/2018 | Susnjara et al. |
| 10,072,179 | B2 | 9/2018 | Drijfhout |
| 10,074,128 | B2 | 9/2018 | Colson et al. |
| 10,076,875 | B2 | 9/2018 | Mark et al. |
| 10,076,876 | B2 | 9/2018 | Mark et al. |
| 10,081,140 | B2 | 9/2018 | Paesano et al. |
| 10,081,431 | B2 | 9/2018 | Seack et al. |
| 10,086,568 | B2 | 10/2018 | Snyder et al. |
| 10,087,320 | B2 | 10/2018 | Simmons et al. |
| 10,087,556 | B2 | 10/2018 | Gallucci et al. |
| 10,099,427 | B2 | 10/2018 | Mark et al. |
| 10,100,542 | B2 | 10/2018 | GangaRao et al. |
| 10,100,890 | B2 | 10/2018 | Bracamonte et al. |
| 10,107,344 | B2 | 10/2018 | Bracamonte et al. |
| 10,108,766 | B2 | 10/2018 | Druckman et al. |
| 10,113,600 | B2 | 10/2018 | Bracamonte et al. |
| 10,118,347 | B2 | 11/2018 | Stauffer et al. |
| 10,118,579 | B2 | 11/2018 | Lakic |
| 10,120,078 | B2 | 11/2018 | Bruder et al. |
| 10,124,546 | B2 | 11/2018 | Johnson et al. |
| 10,124,570 | B2 | 11/2018 | Evans et al. |
| 10,137,500 | B2 | 11/2018 | Blackmore |
| 10,138,354 | B2 | 11/2018 | Groos et al. |
| 10,144,126 | B2 | 12/2018 | Krohne et al. |
| 10,145,110 | B2 | 12/2018 | Carney et al. |
| 10,151,363 | B2 | 12/2018 | Bracamonte et al. |
| 10,152,661 | B2 | 12/2018 | Kieser |
| 10,160,278 | B2 | 12/2018 | Coombs et al. |
| 10,161,021 | B2 | 12/2018 | Lin et al. |
| 10,166,752 | B2 | 1/2019 | Evans et al. |
| 10,166,753 | B2 | 1/2019 | Evans et al. |
| 10,171,578 | B1 | 1/2019 | Cook et al. |
| 10,173,255 | B2 | 1/2019 | TenHouten et al. |
| 10,173,327 | B2 | 1/2019 | Kraft et al. |
| 10,178,800 | B2 | 1/2019 | Mahalingam et al. |
| 10,179,640 | B2 | 1/2019 | Wilkerson |
| 10,183,330 | B2 | 1/2019 | Buller et al. |
| 10,183,478 | B2 | 1/2019 | Evans et al. |
| 10,189,187 | B2 | 1/2019 | Keating et al. |
| 10,189,240 | B2 | 1/2019 | Evans et al. |
| 10,189,241 | B2 | 1/2019 | Evans et al. |
| 10,189,242 | B2 | 1/2019 | Evans et al. |
| 10,190,424 | B2 | 1/2019 | Johnson et al. |
| 10,195,693 | B2 | 2/2019 | Buller et al. |
| 10,196,539 | B2 | 2/2019 | Boonen et al. |
| 10,197,338 | B2 | 2/2019 | Melsheimer |
| 10,200,677 | B2 | 2/2019 | Trevor et al. |
| 10,201,932 | B2 | 2/2019 | Flitsch et al. |
| 10,201,941 | B2 | 2/2019 | Evans et al. |
| 10,202,673 | B2 | 2/2019 | Lin et al. |
| 10,204,216 | B2 | 2/2019 | Nejati et al. |
| 10,207,454 | B2 | 2/2019 | Buller et al. |
| 10,209,065 | B2 | 2/2019 | Estevo, Jr. et al. |
| 10,210,662 | B2 | 2/2019 | Holzer et al. |
| 10,213,837 | B2 | 2/2019 | Kondoh |
| 10,214,248 | B2 | 2/2019 | Hall et al. |
| 10,214,252 | B2 | 2/2019 | Schellekens et al. |
| 10,214,275 | B2 | 2/2019 | Goehlich |
| 10,220,575 | B2 | 3/2019 | Reznar |
| 10,220,881 | B2 | 3/2019 | Tyan et al. |
| 10,221,530 | B2 | 3/2019 | Driskell et al. |
| 10,226,900 | B1 | 3/2019 | Nevins |
| 10,232,550 | B2 | 3/2019 | Evans et al. |
| 10,234,342 | B2 | 3/2019 | Moorlag et al. |
| 10,237,477 | B2 | 3/2019 | Trevor et al. |
| 10,252,335 | B2 | 4/2019 | Buller et al. |
| 10,252,336 | B2 | 4/2019 | Buller et al. |
| 10,254,499 | B1 | 4/2019 | Cohen et al. |
| 10,257,499 | B2 | 4/2019 | Hintz et al. |
| 10,259,044 | B2 | 4/2019 | Buller et al. |
| 10,268,181 | B1 | 4/2019 | Nevins |
| 10,269,225 | B2 | 4/2019 | Velez |
| 10,272,860 | B2 | 4/2019 | Mohapatra et al. |
| 10,272,862 | B2 | 4/2019 | Whitehead |
| 10,275,564 | B2 | 4/2019 | Ridgeway et al. |
| 10,279,580 | B2 | 5/2019 | Evans et al. |
| 10,285,219 | B2 | 5/2019 | Fetfatsidis et al. |
| 10,286,452 | B2 | 5/2019 | Buller et al. |
| 10,286,603 | B2 | 5/2019 | Buller et al. |
| 10,286,961 | B2 | 5/2019 | Hillebrecht et al. |
| 10,289,263 | B2 | 5/2019 | Troy et al. |
| 10,289,875 | B2 | 5/2019 | Singh et al. |
| 10,291,193 | B2 | 5/2019 | Dandu et al. |
| 10,294,552 | B2 | 5/2019 | Liu et al. |
| 10,294,982 | B2 | 5/2019 | Gabrys et al. |
| 10,295,989 | B1 | 5/2019 | Nevins |
| 10,303,159 | B2 | 5/2019 | Czinger et al. |

(56) References Cited

U.S. PATENT DOCUMENTS

| | | |
|---|---|---|
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2005/0211870 A1* | 9/2005 | Browne ............... B29C 33/308 249/134 |
| 2006/0108783 A1 | 5/2006 | Ni et al. |
| 2009/0025865 A1* | 1/2009 | Weidmann ........... B29C 70/342 156/199 |
| 2009/0145545 A1 | 6/2009 | Brennan et al. |
| 2010/0024215 A1* | 2/2010 | Torres Martinez ..... B29C 33/00 29/889.7 |
| 2014/0175703 A1* | 6/2014 | Percival, Jr. .......... B29C 43/021 264/316 |
| 2014/0277669 A1 | 9/2014 | Nardi et al. |
| 2015/0041048 A1 | 2/2015 | Anderson et al. |
| 2015/0084237 A1* | 3/2015 | Siagam ................. B29B 11/16 264/299 |
| 2015/0153724 A1 | 6/2015 | Platt |
| 2015/0248960 A1* | 9/2015 | Khan ..................... H01F 7/08 361/143 |
| 2017/0113344 A1 | 4/2017 | Schönberg |
| 2017/0341309 A1 | 11/2017 | Piepenbrock et al. |
| 2019/0070756 A1* | 3/2019 | Jepsen ............... B29C 33/3842 |

FOREIGN PATENT DOCUMENTS

| | | | |
|---|---|---|---|
| FR | 3013627 A1 * | 5/2015 | ........... B29C 70/543 |
| WO | 1996036455 A1 | 11/1996 | |
| WO | 1996036525 A1 | 11/1996 | |
| WO | 1996038260 A1 | 12/1996 | |
| WO | 2003024641 A1 | 3/2003 | |
| WO | 2004108343 A1 | 12/2004 | |
| WO | 2005093773 A1 | 10/2005 | |
| WO | 2007003375 A1 | 1/2007 | |
| WO | 2007110235 A1 | 10/2007 | |
| WO | 2007110236 A1 | 10/2007 | |
| WO | 2008019847 A1 | 2/2008 | |
| WO | 2007128586 A3 | 6/2008 | |
| WO | 2008068314 A2 | 6/2008 | |
| WO | 2008086994 A1 | 7/2008 | |
| WO | 2008087024 A1 | 7/2008 | |
| WO | 2008107130 A1 | 9/2008 | |
| WO | 2008138503 A1 | 11/2008 | |
| WO | 2008145396 A1 | 12/2008 | |
| WO | 2009083609 A2 | 7/2009 | |
| WO | 2009098285 A1 | 8/2009 | |
| WO | 2009112520 A1 | 9/2009 | |
| WO | 2009135938 A1 | 11/2009 | |
| WO | 2009140977 A1 | 11/2009 | |
| WO | 2010125057 A2 | 11/2010 | |
| WO | 2010125058 A1 | 11/2010 | |
| WO | 2010142703 A2 | 12/2010 | |
| WO | 2011032533 A1 | 3/2011 | |
| WO | 2014016437 A1 | 1/2014 | |
| WO | 2014187720 A1 | 11/2014 | |
| WO | 2014195340 A1 | 12/2014 | |
| WO | 2015193331 A1 | 12/2015 | |
| WO | 2016116414 A1 | 7/2016 | |
| WO | 2017036461 A1 | 3/2017 | |
| WO | 2019030248 A1 | 2/2019 | |
| WO | 2019042504 A1 | 3/2019 | |
| WO | 2019048010 A1 | 3/2019 | |
| WO | 2019048498 A1 | 3/2019 | |
| WO | 2019048680 A1 | 3/2019 | |
| WO | 2019048682 A1 | 3/2019 | |

OTHER PUBLICATIONS

US 9,809,265 B2, 11/2017, Kinjo (withdrawn)
US 10,449,880 B2, 10/2019, Mizobata et al. (withdrawn)
Machine translation of German Patent Publication No. DE-10342867A1, originally published Apr. 28, 2005 (Year: 2005).*
Machine translation of French Patent Publication No. FR-3013627A1, originally published May 29, 2015 (Year: 2015).*
Invitation to Pay Additional Fees received in PCT/US2019/030173 dated Jun. 24, 2019.
International Search Report & Written Opinion received in PCT/US2019/030173 dated Aug. 30, 2019.

* cited by examiner

FLEXIBLE TOOLING SYSTEM AND METHOD FOR MANUFACTURING OF COMPOSITE STRUCTURES

BACKGROUND

Technical Field

The present disclosure relates generally to manufacturing techniques, and, more specifically, to a system and method for manufacturing composite structures.

Background

In general, numerous types of physical components are manufactured both as "off the shelf" components and customized components that can serve any one or more of functional, structural or aesthetic purposes within various products. Many types of manufactured components will be formed of a generally rigid structural member composed of metal, an alloy, a polymer, or another suitable material. The structural member may have a predefined shape and may include one or more surfaces, indentations, or cavities that are manufactured to adhere to separate layers of a suitably molded composite material. For example, part of an interior door panel in a vehicle may include a metal or plastic structure inlaid with carbon fiber reinforced polymer (CRFP). In this example, the CRFP layer may be included to add strength and durability to the panel while maintaining a comparatively lightweight and aesthetically-pleasing design. Many other types of composite materials may be used, depending on factors like the type of structure and the nature and intended use of the part.

Machining the tooling surfaces used to mold the layers of composite material into the desired shape for use with such a structure is, more often than not, an expensive and time-consuming process. In conventional production techniques, a tooling surface for molding the composite material is typically manufactured using labor-intensive processes. Moreover, the tooling surfaces are typically composed of one or more materials that are chemically and structurally suitable for use in manufacturing the composite materials. Often such structures have properties that make them difficult to accurately cut into the desired shape or form detailed features. Yet further after the forming the composite structure is complete, the tooling surfaces may have limited or no further uses beyond the scope of use to form that single type of part. Accordingly, a system and method is needed for providing reusable tooling surfaces that improve manufacturing efficiencies and costs.

SUMMARY

Thus, a system and method is provided for manufacturing a composite structure using a printed flexible tooling surface. More particularly, a manufacturing system is provided that includes a plurality of flexible tooling plates that are interlocked to one another and that have specific curvatures with built-in actuators that can be manipulated to a desired tooling surface with desired contours for manufacturing the composite structure. Moreover, the flexible array of interconnected plates can have a thin layer of flexible material provided thereon to remove any small surface deviations that may result from the resolution defined by the individual plate size. The thin flexible layer will serve as the actual tooling surface for manufacturing a composite structure. In the exemplary aspect, the tooling surface is variable due to the flexible nature of the interlocking plates such that a wide variety of contours and surfaces can be produced without changing the tooling.

According to one exemplary aspect, a method is provided for manufacturing a composite structure. In this aspect, the method includes storing, in electronic memory, a design contour for at least one surface of a composite structure to be manufactured; adjusting a plurality of actuators coupled to a plurality of plates interlocked with each other to define a tooling surface that corresponds to the at least one surface of the composite structure to be manufactured; applying a composite material to the tooling surface defined by the adjusted plurality of interlocked plates; and curing the composite material to form the composite structure.

In another exemplary aspect, a system is provided for manufacturing a composite structure. In this aspect, the system includes a plurality of flexible plates interlocked to each other to form a tooling surface for forming a composite structure to be manufactured. Moreover, the system further includes a plurality of actuators coupled to the plurality of flexible plates and configured to move the plurality of flexible plates relative to each other to adjust a contour of the tooling surface to correspond to a design contour of the composite structure to be manufactured.

It should be understood that other aspects of the exemplary systems and methods for manufacturing composite structures will become readily apparent to those skilled in the art from the following detailed description, wherein it is shown and described only several embodiments by way of illustration. As will be realized by those skilled in the art, the parts and methods of producing the parts are capable of other and different embodiments and its several details are capable of modification in various other respects, all without departing from the invention. Accordingly, the drawings and detailed description are to be regarded as illustrative in nature and not as restrictive.

BRIEF DESCRIPTION OF THE DRAWINGS

A flexible tooling system and method will now be presented in the detailed description by way of example, and not by way of limitation, in the accompanying drawings, wherein.

DETAILED DESCRIPTION

The detailed description set forth below in connection with the appended drawings is intended to provide a description of various exemplary embodiments of techniques for flexible tooling according to the exemplary aspects disclosed herein and is not intended to represent the only embodiments in which the invention may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

In general, the use of additive manufacturing, also known as three-dimensional ("3-D") printing, in the context of composite tooling provides significant flexibility for enabling manufacturers of mechanical structures and mechanized assemblies to manufacture parts and structures with complex geometries. For example, 3-D printing techniques provide manufacturers with the flexibility to design and build parts having intricate internal lattice structures and/or profiles that are not possible to manufacture via traditional manufacturing processes. The exemplary system and method disclosed herein utilizes such 3-D printing technologies to prepare a plurality of 3-D printed plates for forming a flexible tooling surface as will be described in detail below. However, as also described above, the flexible tooling plates are 3-D printed according to an exemplary aspect, but can be manufactured using alternative methods (e.g., casting) for manufacturing composite structures in alternative aspects.

Figure 1:
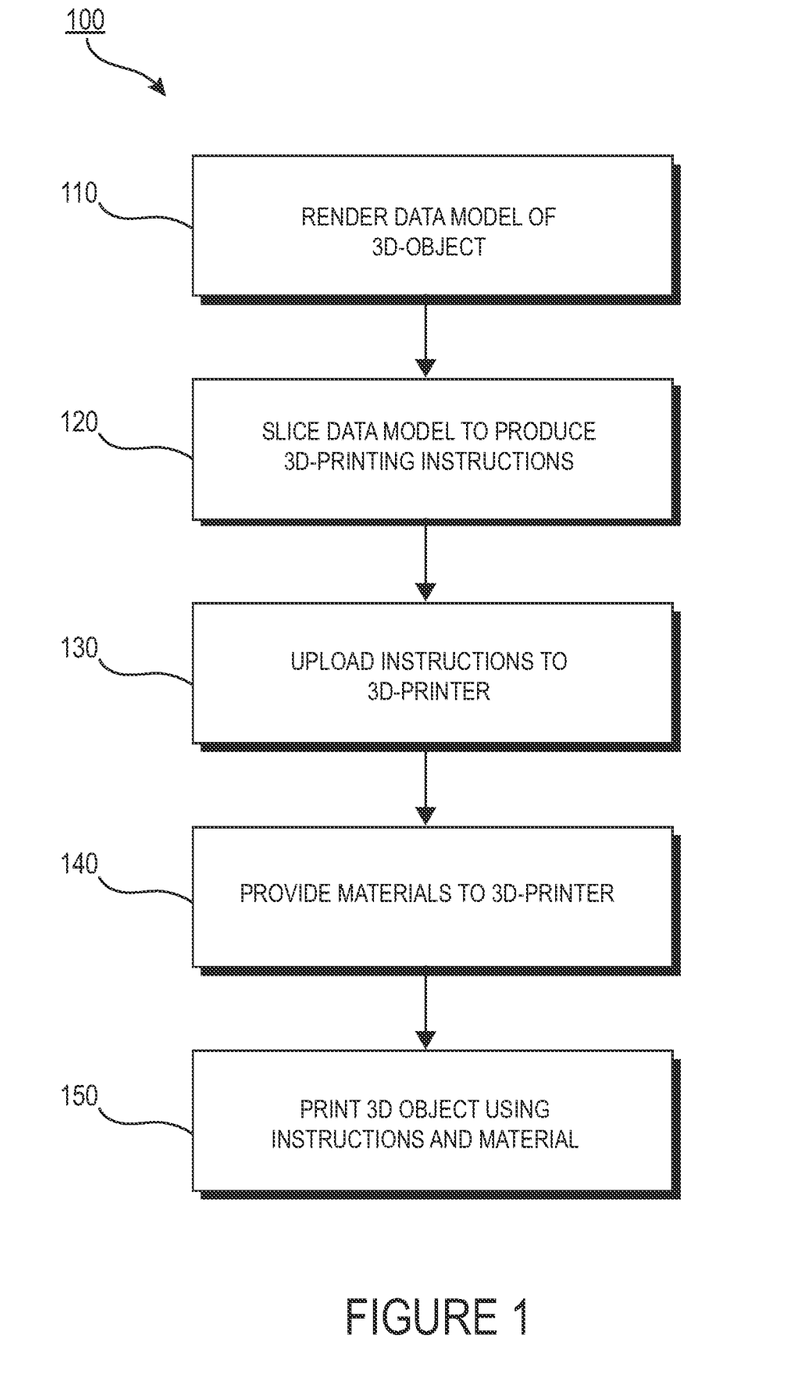
FIG. 1 provides a flow diagram illustrating an exemplary process of initiating a process of 3-D printing.

FIG. 1 provides a flow diagram 100 illustrating an exemplary process of initiating a process of 3-D printing, which can be used for forming the plates for the flexible tooling, which can be 3-D printed plates, according to an exemplary aspect. Initially, at step 110, a data model of the desired 3-D object (e.g., the 3-D plates) to be printed is rendered. A data model is a virtual design of the 3-D object to be manufactured. Thus, the data model may reflect the geometrical and structural features of the 3-D object, as well as its material composition. The data model may be created using a variety of methods, including 3-D scanning, 3-D modeling software, photogrammetry software, and camera imaging.

In general, 3-D scanning methods for creating the data model may also use a variety of techniques for generating a 3-D model. These techniques may include, for example, time-of flight, volumetric scanning, structured light, modulated light, laser scanning, triangulation, and the like.

3-D modeling software, in turn, may include one of numerous commercially available 3-D modeling software applications. Data models may be rendered using a suitable computer-aided design (CAD) package, for example in an STL format. STL files are one example of a file format associated with commercially available CAD software. A CAD program may be used to create the data model of the 3-D object as an STL file. Thereupon, the STL file may undergo a process whereby errors in the file are identified and resolved.

Following error resolution, the data model can be "sliced" at step 120 by a software application known as a slicer to thereby produce a set of instructions for 3-D printing the object, with the instructions being compatible and associated with the particular 3-D printing technology to be utilized. Numerous slicer programs are commercially available. Slicer programs convert the data model into a series of individual layers representing thin slices (e.g., 100 microns thick) of the object be printed, along with a file containing the printer-specific instructions for 3-D printing these successive individual layers to produce an actual 3-D printed representation of the data model.

In an exemplary aspect, a common type of file used for this purpose is a G-code file, which is a numerical control programming language that includes instructions for 3-D printing the object. The G-code file, or other file constituting the instructions, is uploaded to the 3-D printer at step 130. Because the file containing these instructions is typically configured to be operable with a specific 3-D printing process, it will be appreciated that many formats of the instruction file are possible depending on the 3-D printing technology used.

In addition to the printing instructions that dictate what and how an object is to be rendered, the appropriate physical materials necessary for use by the 3-D printer in rendering the object are loaded into the 3-D printer using any of several conventional and often printer-specific methods at step 140. In fused deposition modelling (FDM) 3-D printers, for example, materials are often loaded as filaments on spools, which are placed on one or more spool holders. The filaments are typically fed into an extruder apparatus which, in operation, heats the filament into a melted form before ejecting the material onto a build plate or other substrate, as further explained below. In selective laser sintering (SLS) printing and other methods, the materials may be loaded as powders into chambers that feed the powder to a build platform. Depending on the 3-D printer, other techniques for loading printing materials may be used.

Finally, at step 150, the respective data slices of the 3-D object are then printed based on the provided instructions using the material(s). In 3-D printers that use laser sintering, a laser scans a powder bed and melts the powder together where structure is desired, and avoids scanning areas where the sliced data indicates that nothing is to be printed. This process may be repeated thousands of times until the desired structure is formed, after which the printed part is removed from a fabricator. In fused deposition modelling, parts are printed by applying successive layers of model and support materials to a substrate. In general, any suitable 3-D printing technology may be employed for purposes of this disclosure.

Figure 2:
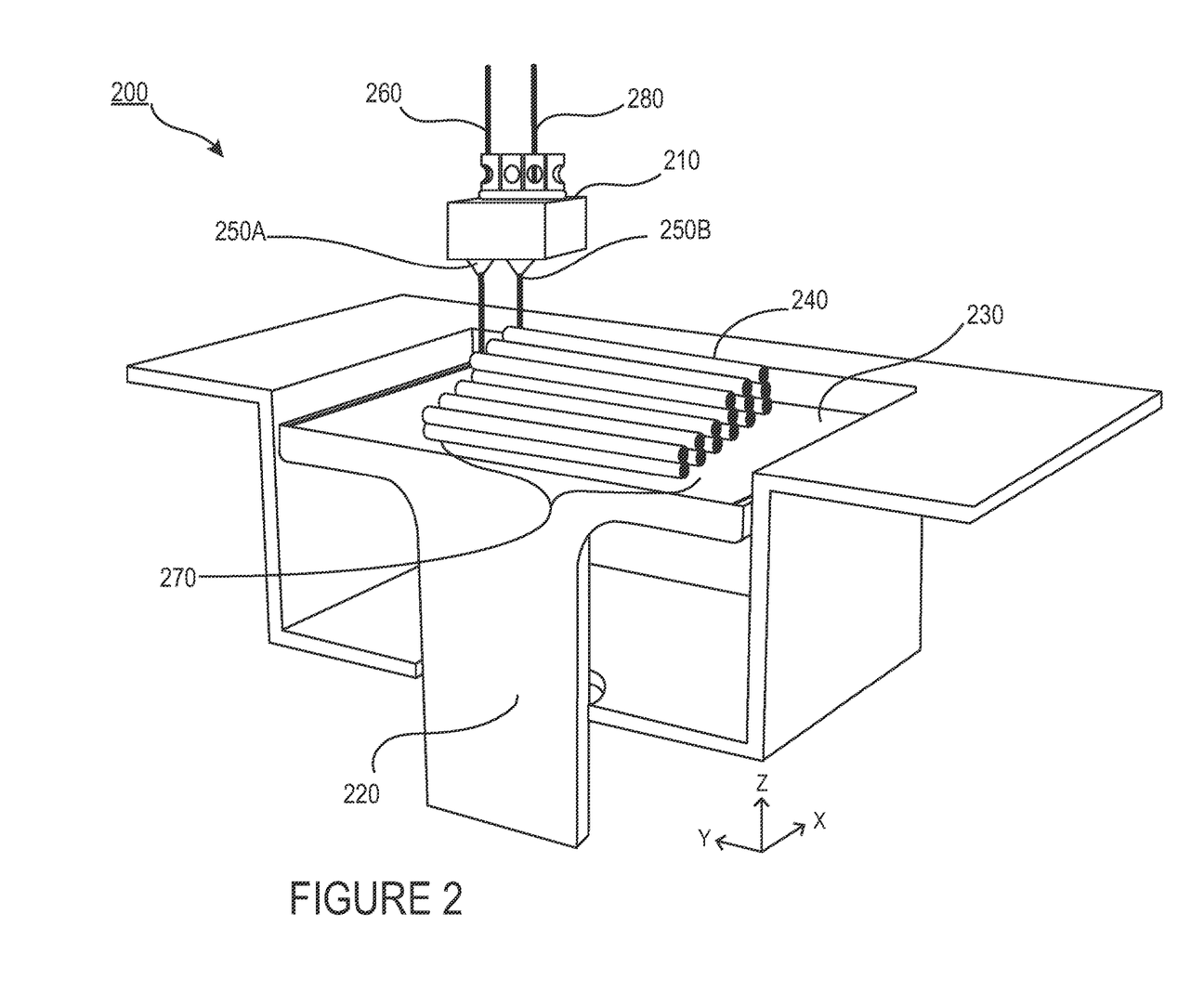
FIG. 2 illustrates a block diagram of a 3-D printer configured to provide a flexible tooling surface according to an exemplary aspect.

FIG. 2 illustrates a block diagram of a 3-D printer 200 configured to print a plurality of flexible tooling plates according to an exemplary aspect. While any number of 3-D printing technologies can be suitably employed, the 3-D printer 200 of FIG. 2 is discussed in the context of an FDM technique. 3-D printer 200 includes an FDM head 210 which in turn includes extrusion nozzles 250A and 250B, a moveable build stage 220, and a build plate 230 at the top of the build stage 220. According to an exemplary aspect, the 3-D printer is configured to form a plurality of flexible tooling plates that are interlocked to provide a flexible tooling surface, the details of which will be described below.

It is noted that while the plurality of flexible tooling plates are described as 3-D printed plates manufactured using an FDM technique as described above, the flexible tooling plates can be manufactured using various different manufacturing processes that are known to those skilled in the art. For example, the printing process selected for the manufacturing of the printed tooling plates can depend on a variety of factors known to those skilled in the art, including, for example, material of the 3-D printed plates, Coefficient of Thermal Expansion ("CTE") of the 3-D printed plates, and compatibility with the CTE of the composite during the curing process, melting/glass transition temperature of the 3-D printed plates and the like. For example, in another exemplary aspect, the flexible tooling plates can be manufactured using a power-bed fusion ("PBF") system.

In general, depending on the intended composition of the structure and the need for any support material for providing support to overhanging elements of the structure that might otherwise be subject to possible gravitational deformation or collapse, a plurality of materials may be used for printing the flexible tooling plates. One or more suitable filament materials 260 may be wound on a spool (not shown) and fed into FDM head 210. (In other technologies described above, the material may be provided as a powder or in other forms). The FDM head 210 can be moved in X-Y directions based on the received printing instructions by a numerically controlled mechanism such as a stepper motor or servo motor. The material, which may in one exemplary embodiment constitute a thermoplastic polymer, may be fed to the FDM head 210 which includes the extrusion nozzles 250A and 250B. The extruder in FDM head 210 heats the filament material 260 into a molten form, and extrusion nozzle 250*a* ejects the molten material and deposits it onto the build plate 230 of build stage 220.

Responsive to the received printing instructions, the FDM head 210 moves about a horizontal (X-Y) plane such that extrusion nozzle 250A drops the material 260 at the target location to form a line 240 of applied material. In an exemplary aspect, the FDM head 210 may also be configured to move in the Z-direction and/or to rotate about one or more axes in certain configurations. The layer 270 of material 260, including line 240, is formed by depositing the material 260 line by line, with each line of the material 260 hardening as the material is deposited on the build plate 230. After one layer 270 is formed at the appropriate locations in the X-Y plane, the next layer may be formed in a similar way.

When rendering of a layer 270 is completed, the build stage 220 and build plate 230 may lower by an amount proportional to the thickness of layer 270 in the vertical (Z) direction so that the printer can begin application of the next layer, and so on until a plurality of cross sectional layers 240 having a desired shape and composition are created.

While a substantially rectangular structure of layers 240 is shown for printing the flexible tooling plates for purposes of simplicity in this illustration, it will be appreciated that the actual printed structure may embody substantially any shape and configuration depending on the data model, which specifies the contours for the flexible tooling plates. In addition, as indicated above, a plurality of different materials may be used to print the plates in an exemplary aspect. In some instances, two different materials 260 and 280 may concurrently be applied by respective extruder nozzles 250A and 250B.

Using the 3-D printing process (i.e., additive manufacturing) described above, a plurality of flexible plates can be created for manufacturing a composite structure according to an exemplary aspect. In particular, the plurality of flexible tooling plates (i.e., 3-D printed plates) can be interlocked to one another as described below to provide a flexible tooling surface for the manufacturing of a desired composite structure. It is reiterated that that while the plurality of flexible plates are formed using the additive manufacturing process and system described above, the plurality of flexible plates can be formed using other manufacturing processes (e.g., casting) according to alternative aspects as would be appreciated by one skilled in the art.

Figure 3:
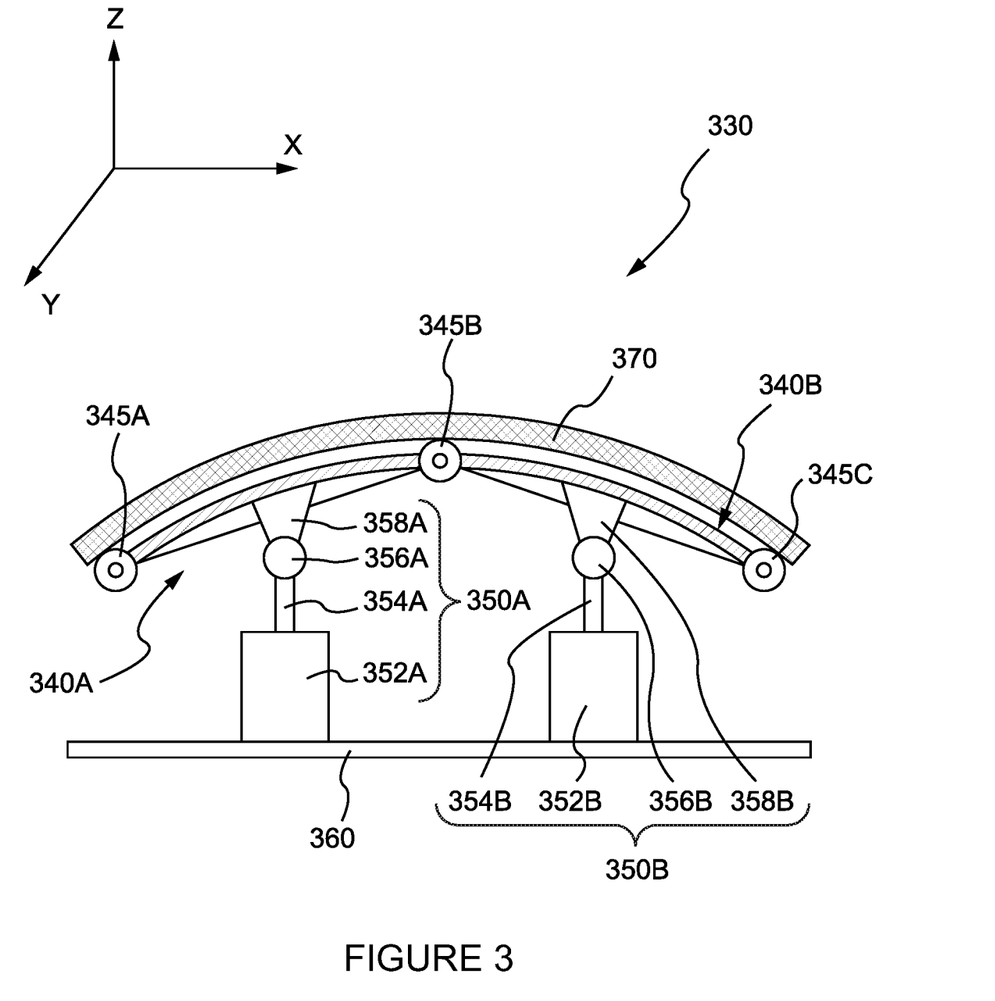
FIG. 3 illustrates an exemplary flexible tooling surface according to an exemplary aspect.

FIG. 3 illustrates an exemplary flexible tooling surface according to an exemplary aspect. In general, the flexible tooling surface 330 is configured as a controllable surface that can be easily and efficiently manipulated to define a contoured tooling surface for manufacturing a composite structure based on the rendered data model of the structure. That is, in an exemplary aspect, when the instructions for manufacturing a desired object are uploaded to a controller configured to control the flexible tooling surface 330, the controller can adjust the surface contours defined by flexible tooling surface 330 and hold the varying contours in support of the composite laminate layup process. The composite material can then be applied to the flexible tooling surface 330 by hand or by standard automation machinery, to form the composite structure.

As specifically shown in FIG. 3, the flexible tooling surface 330 includes a plurality of flexible tooling plates (e.g., 3-D printed plates 340A and 340B) that are configured to interlock with one another. In an exemplary aspect, tooling plate 340A is coupled to (i.e., interlocked with) tooling plate 340B by an interlocking or connecting member 345B. It is noted that the specific mechanical configuration for interlocking the two tooling plates 340A and 340B is not particularly limited and that interlocking/connecting member 345B may be any type of mechanical connector, such as a rotatable hinge, that enables the pair of tooling plates 340A and 340B to be positioned and moved in various orientations relative to each other in order to define the desired contour for the manufacturing process. Moreover, the two tooling plates 340A and 340B may be permanently fixed to one another by interlocking/connecting member 345B.

Moreover, it is noted that while only two flexible tooling plates 340A and 340B are illustrated in the exemplary aspect, the flexible tooling surface 330 may be formed using any number of tooling plates configured to be interlocked to one another by interlocking/connecting members. Thus, as further shown for exemplary purposes, interlocking/connecting member 345A is provided to connect tooling plate 340A to another tooling plate (not shown) and, likewise, interlocking/connecting member 345C is provided to connect tooling plate 340B to another tooling plate (also not shown).

In addition, the plurality of flexible tooling plates (e.g., 3-D printed plates 340A and 340B) as supported and positioned by an array of actuators. In this aspect, the shape of the flexible tooling surface plate 330 will be created by positioning the plurality of tooling plates using the actuator array. More specifically, each of the plurality of tooling plates is coupled and supported by one or more actuators of the actuator array. For example, as shown, actuator 350A supports and is configured to position tooling plate 340A, and actuator 350B supports and is configured to position tooling plate 340B. In the exemplary aspect, each of the plurality of actuators 350A and 350B in the actuator array is configured to adjust the position of its coupled tooling plate in the vertical direction, for example. In other words, the actuators 350A and 350B are configured to move up and down in the Z axis direction to define the respective positions of the flexible tooling plates relative to one another. In an alternative aspect, the actuators may also be configured to shift the plurality of tooling plates in a lateral direction (i.e., the X and Y axis directions) and/or in combination of vertical and lateral directions.

Furthermore, in an exemplary aspect, a controller (e.g., a computer processor unit) is configured to receive actuator positioning instructions based on a rendered data model of the composite structure to be manufactured, which can be stored in electronic memory thereof in a similar manner as the 3-D printing process described above. Moreover, the stored instructions include the desired one or more contours to define a tooling surface for the manufacturing of the composite structure. In this aspect, the controller is configured to control the actuators 350A and 350B to adjust the positioning of each respective interlocked tooling plate (e.g., 3-D printed plates 340A and 340B, respectively) to define the contours of the tooling surface for manufacturing the composite structure.

It is noted that the particular structure of each actuator is not so limited as long as the mechanical structure of each actuator is configured to adjust the relative position of the respective interlocked plates at least in the vertical (i.e., Z axis) direction. However, according to the exemplary aspect, plate actuator 350A includes a driver 352A, a position adjusting shaft 354A, a hinge 356A and a connecting member 358A. Likewise, plate actuator 350B includes a driver 352B, a position adjusting shaft 354B, a hinge 356B and a connecting member 358B. In this aspect, each of actuator drivers 352A and 352B is configured to drive the respective position adjusting shaft 354A and 354B in the vertical direction (i.e., the Z axis direction) to move the respective interlocked plates. Moreover, respective hinges 356A and 356B are coupled to the top ends of position adjusting shaft 354A and 354B, respectively, and are coupled in turn to the connecting members 358A and 358B. In this configuration, the connecting members 358A and 358B freely pivot about the respective hinges 356A and 356B as the position adjusting shaft 354A and 354B are driven either up or down to define the respective positions of the interlocked plates. As a result, the actuators 350A and 350B are able to easily and freely defining the contours of the flexible tooling surface 330 for manufacturing the desired composite structure. Furthermore, the actuator array is disposed on a base 360 of the tooling system that is provided to support the flexible tooling surface 330.

As further shown, a thin flexible layer of continuous material 370 is disposed on top of the interlocked tooling plates to provide a smooth tooling surface, while capturing the variable contours created by the flexible tooling system. In an exemplary aspect, the flexible material layer 370 can be formed by Silicone, hard rubber, or the like as would be appreciated to one skilled in the art. The flexible material layer 370 is configured to remove the small surface deviations resulting from the resolution defined by the individual plate size. Moreover, it should be appreciated that this thin flexible material layer 370 defines the actual tooling surface for manufacturing the desired composite structure.

In operation, once the actuator array is adjusted to define the desired tooling surface (i.e., the flexible material layer 370 positioned by the adjusted flexible tooling plates 340A and 340B), and while this desired design contour held by the flexible tooling system, the composite material is applied to the tooling surface and cured as described above to manufacture the composite structure. When the composite structure is fully cured, trimming can be either a manual or automated process occurring either on or off the flexible tooling system as would be appreciated to one skilled in the art. Moreover, in a refinement of this aspect, the composite structure can be removed and/or repositioned, such that the plurality of actuators can be adjusted to define a different design contour for another surface of the composite structure to be manufactured.

Advantageously, the tooling surface is made variable due to the flexible nature of the interlocking plates (i.e., the flexible tooling plates 340A and 340B) such that a wide variety of contours can be produced without changing the tooling. Thus, the flexible tooling system is reusable such that once the composite structure is cured, it can be removed and the tooling surface defined by the interlocked plates can be reshaped by the actuators for the next contour. Depending on the requirements for each unique layup, the flexible material layer 370 comprising the actual tooling surface can be kept or removed and replaced as needed for each application. In this aspect, the provision of the flexible material layer 370 can be coordinated with the underlying interlocked plates 340A and 340B, such that a few unique sets and combinations of plates and flexible surfaces can provision a wide variety of possible surfaces, and, thereby, greatly reduce the need for unique tooling for each type of composite structure to be manufactured. In other words, the interlocked plates of flexible tooling surface 330 enable the manufacturing of multiple types of composite structures having various designs and contours by being able to easily and dynamically adjusting the contours defined by the interlocked flexible tooling plates using the techniques described above.

Figure 4:
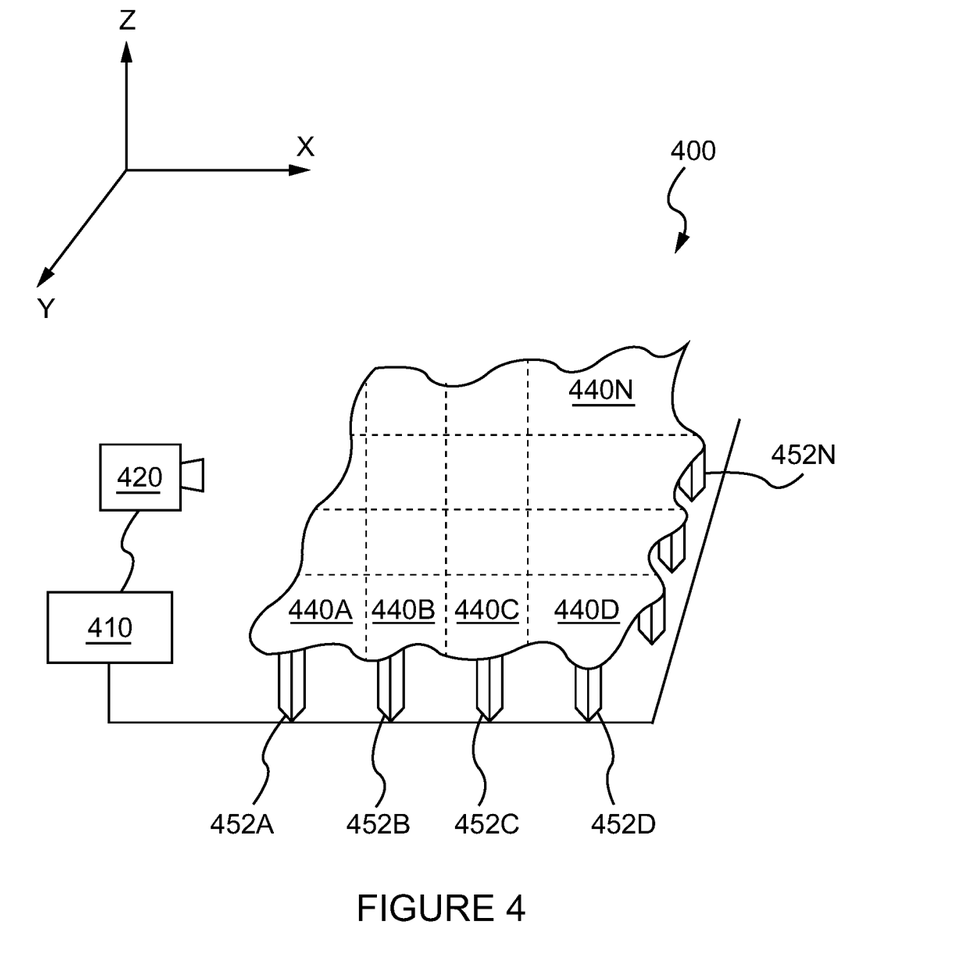
FIG. 4 illustrates a perspective view of the flexible tooling system according to an exemplary aspect.

FIG. 4 illustrates a perspective view of the flexible tooling system according to an exemplary aspect. In general, the flexible tooling system 400 is shown as including the flexible tooling surface and a plurality of actuators coupled thereto. In the exemplary aspect, the flexible tooling system 400 includes a plurality of interlocked plates 440A to 440N that are provided to form a 3-D flexible tooling surface (i.e., flexible tooling surface 330). It should be appreciated that a portion of the tooling plates 440A to 440N can correspond to interlocked plates 340A and 340B as described above. Moreover, a plurality of actuators 452A to 452N are provided underneath the tooling surface and configured to support and adjust the positioning of interlocked plates 440A to 440N. It should likewise be appreciated that a portion of plurality of actuators 452A to 452N can correspond to plate actuators 350A and 350B in an exemplary aspect. The details of actuators 452A to 452N are not shown, but can also have a similar structural configuration of plate actuators 350A and 350B as also described above.

As further shown, a controller 410 is provided and communicatively coupled to the plurality of actuators 452A to 452N. In one aspect, controller 410 is connected to the plurality of actuators 452A to 452N by a physical connection (e.g., hard wired) while in another aspect, the controller 410 may be wirelessly connected by WiFi, Bluetooth, or the like, to the plurality of actuators 452A to 452N. In either case, the controller 410 may be a computing device that is configured to receive the composite structure manufacturing instructions and to drive the positioning of the interlocked plates 440A to 440N by the respective actuator array 452A to 452N in order to define the tooling surface based on these instructions.

Moreover, in an exemplary aspect, a 3-D scanner 420 (e.g., 3-D camera, image sensor, etc.) is configured to continuously scan the contours define by the tooling surface as the actuator array 452A to 452N is adjusting the interlocked tooling plates 440A to 440N to define the desired contour surface. In this aspect, the 3-D scanner 420 is also coupled (either wired or wirelessly) to the controller 410 and configured to provide imaging results of the scanning process. As a result, conformation of surface accuracy of the tooling surface can be controlled in real time using the 3-D scanning with feedback controlling the array of actuators, i.e., the controller 410 is configured to continuously adjust the positioning of the tooling surface until the 3-D scanned image of the actual tooling surface defined by interlocked tooling plates 440A to 440N matches the desired tooling surface defined by data model of the composite structure to be manufactured.

Figure 5A:
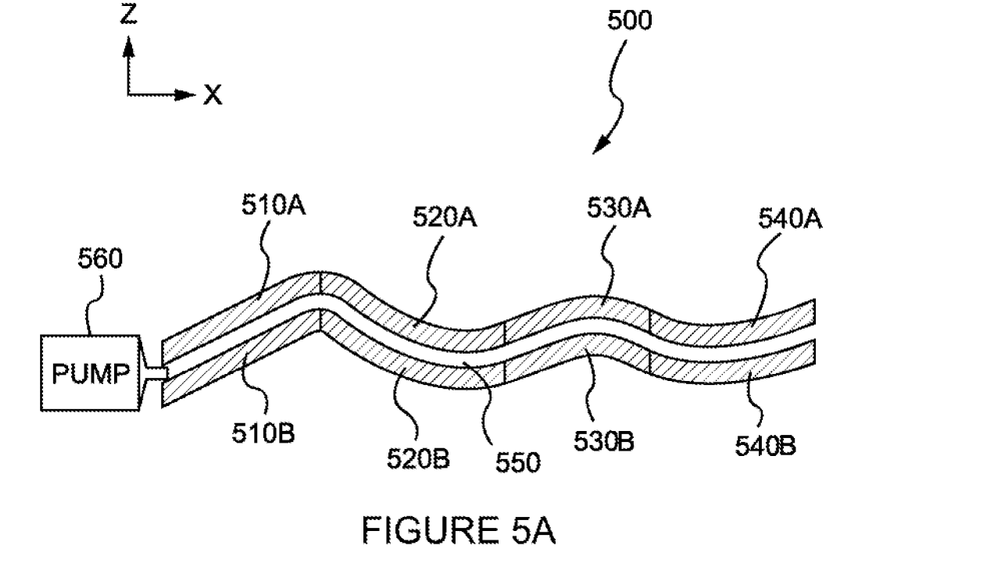
FIG. 5A illustrates a refinement of the exemplary flexible tooling system according to an exemplary aspect.

FIG. 5A illustrates a refinement of the exemplary flexible tooling system 500 according to an exemplary aspect. In particular, this figure illustrates a cross sectional view (in the Z axis direction) of a plurality of the interlocked plates as described above. For example, four interlocked plates are shown having an upper layer and lower layer to collectively define each plate. These four interlocked plates may be additively manufactured (i.e., 3-D printed plates) or 3-D printed using the process and system described above with respect to FIGS. 1 and 2, although the interlocked plates can be manufactured using alternative manufacturing processes as would by understood by one skilled in the art. Thus, the interlocked plates are 3-D printed plates according to only one exemplary aspect.

In the exemplary aspect, upper layer 510A and lower layer 510B define a first 3 plate, upper layer 520A and lower layer 520B define a second plate, upper layer 530A and lower layer 530B define a third plate, and upper layer 540A and lower layer 540B define a fourth plate. It should be appreciated that the plates are each connected to one another by interlocking/connecting member (e.g., interlocking/connecting member 345A to 345C) as described above, but these connecting members are not shown in FIG. 5A so as to not unnecessarily obscure the aspects of this embodiment.

According to the exemplary aspect, each of the respective upper and lower layers of each plate define one or more channels extending therethrough. Thus, as shown, a plurality of channels are fluidly connected to one another to form a channel 550 extending between the plates. Moreover, a mechanical pump 560 is provided and is in fluid communication with an opening of at least one of the channels extending through the plurality of interlocked plates 440A to 440N. Thus, according to an exemplary aspect, the mechanical pump 560 is configured to pump a water-soluble material into channels built into the interlocked plates 440A to 440N that harden to holds the plates in the desired position once set by the actuator array. Advantageously, by pumping the water-soluble material, the exemplary configuration can reduce the number of actuators needed to support the flexible tooling surface. Moreover, once the laminate is cured and removed, the channels in the interlocked tooling plates 440A to 440N can be rinsed and flushed to render the plates flexible once again for manufacturing of the next composite structure.

Figure 5B:
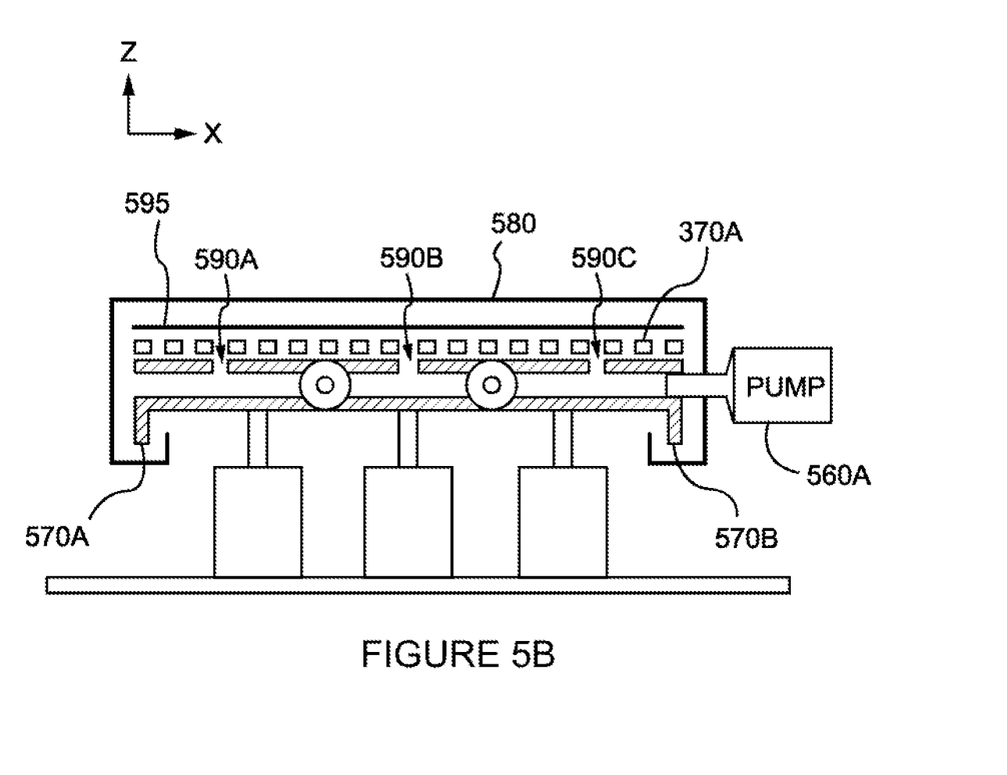
FIG. 5B illustrates another refinement of the exemplary flexible tooling system according to an exemplary aspect.

FIG. 5B illustrates another refinement of the exemplary flexible tooling system according to an exemplary aspect. In this exemplary aspect, one or more of the interlocked plates (e.g., 3-D printed plates 440A to 440N as described above), which form the flexible support structure for the tooling surface, can include a vacuum bag connector extending from the flexible support structure. That is, preferably one or more of the perimeter tooling plates have a vacuum bag connector (e.g., connecting members 570A and 570B) built in to (or coupled thereto) the outer perimeter and configured to connect a standardized vacuum bagging system for curing the composite. For example, as shown, the connecting members 570A and 570B can vertically extending edges that extending downward, for example, from the respective bottom surfaces of the perimeter plates to in the Z axis direction. It should be noted that the connecting members 570A and 570B can be formed by any type of connecting or flipping mechanism for securing a vacuum bag thereto and drawing a vacuum, as would be appreciated to one skilled in the art.

A vacuum bag 580 can be attached to plurality of vacuum bag connectors 570A and 570B, for example, where the composite layup 595 can be sealed therein. The vacuum may be drawn using the connectors to cure the composite layup to form the composite structure. For example, as further shown, the thin flexible layer of continuous material can be a flexible perforated film 370A with one or a plurality of vacuum outlets (e.g., outlets 590A to 590C) disposed between respective pairs or a plurality of the interlocked tooling plates. In addition, the mechanical pump 560A can be further configured to remove air from inside the vacuum bag 580 and through the vacuum outlets 590A to 590C to seal the composite layup (e.g., composite 595) within the vacuum bag 580 during the curing process, for example.

Moreover, in an additional exemplary aspect of the manufacturing processes described herein, one or more of the interlocked plates 440A to 440N can also be provided with a temperature sensor (not shown) disclosed therein that is communicatively coupled to a controller of the system (e.g., controller 410 described above). In this aspect, the array of flexible tooling plates facilitates temperature control via the built-in fluid flow channels such that deformation of the tooling surface due to the thermal loads under curing are eliminated. The temperature sensor is configured to monitor a temperature in at least one of the plurality of interlocked plates. If the temperature exceeds a predefined threshold (i.e., a threshold predetermined that may lead to deformation), the controller includes a heater control that adjusts a thermal load of the heater during the curing process in order to prevent deformation of the defined tooling surface during curing of the composite material.

In general, it is noted that the flexible tooling plates may include any material having appropriate or suitable characteristics for molding another material. For example, if the material to be molded using the tooling plates is carbon fiber reinforced polymer (CFRP), then an Invar alloy may be a suitable candidate for use in molding the material because its coefficient of thermal expansion is very similar to that of carbon fiber. In other cases, the tooling structure may be composed of other materials, including metals, alloys and plastics.

Figure 6:
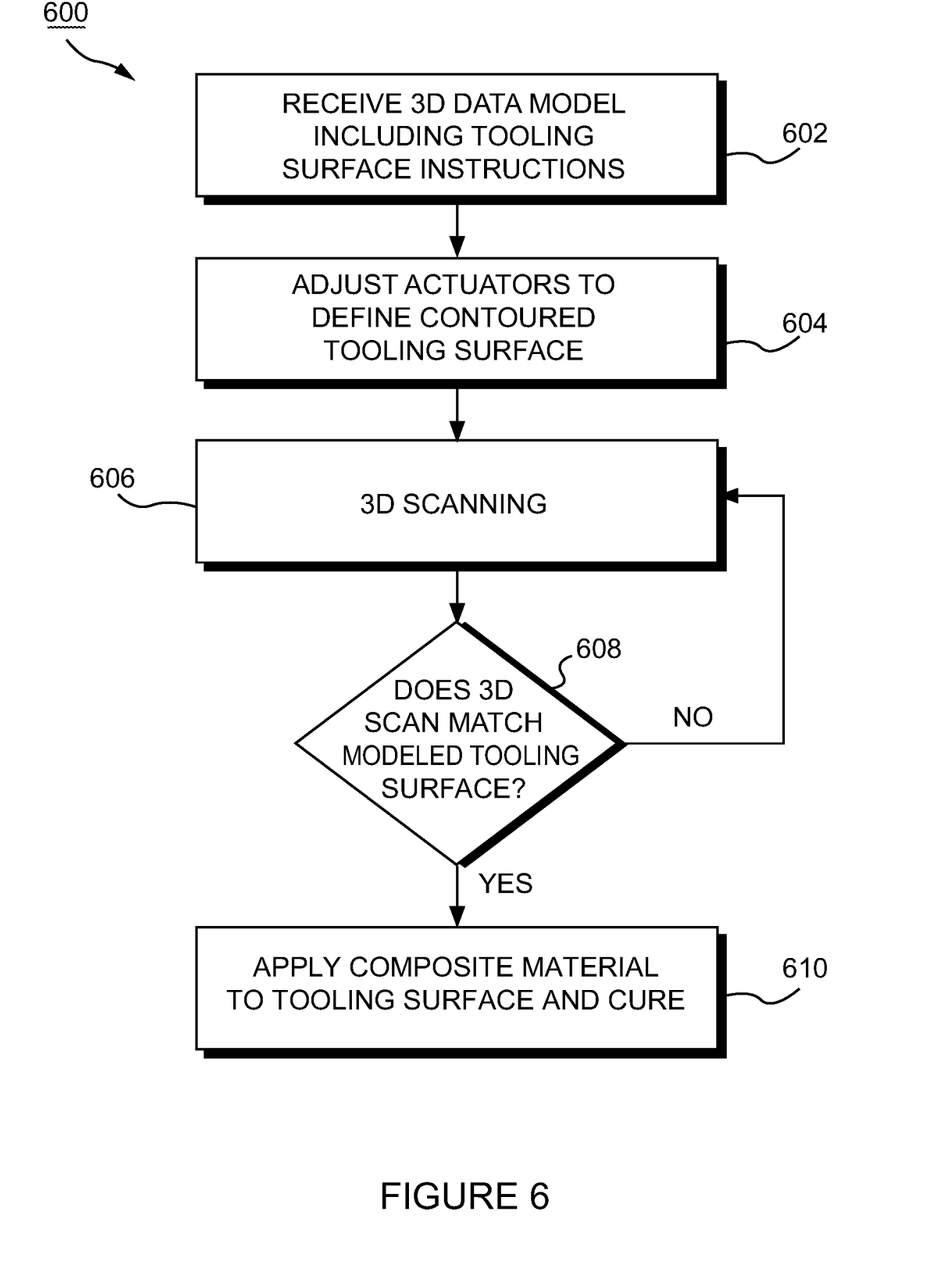
FIG. 6 illustrates a exemplary flow diagram of a method for manufacturing a composite structure according to an exemplary aspect.

FIG. 6 illustrates a exemplary flow diagram of a method for manufacturing a composite structure according to an exemplary aspect. As shown, initially at step 602, a controller (e.g., controller 410) receives a 3-D data model that includes a defined/desired tooling surface for manufacturing a composite structure. At step 604, the controller is configured to manipulate an actuator array (e.g., plate actuators 350A and 350) to define a contoured surface by moving the interlocked flexible tooling plates (e.g., 3-D printed plates 340A and 340B).

In one aspect, during operation and manipulation of the actuator array, a 3-D scanner is configured to periodically or continuously scan the flexible tooling surface defined by the interlocked flexible tooling plates and pass the resulting image to the controller of the manufacturing machine at step 606. The controller can further be configured to compared the scanned image with the 3-D data model for the composite structure to be manufactured at step 608. If the compared image is not within a predetermined fault threshold, for example, the method returns to step 606 to continuously adjust the actuator array (i.e., as part of a feedback loop) until the 3-D scanned images matches the 3-D data model within the threshold. Upon a sufficient match, the method proceeds to step 610 in which a composite material, such as CFRP or another composite fabric, is applied to the flexible tooling surface and a composite fabrication process is used to mold and harden the material, by curing the material, for example.

By way of example, an element, or any portion of an element, or any combination of elements for the controller 410 as described above may be implemented as a "processing system" that includes one or more microprocessors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software for controlling the actuator array according to the algorithms described above. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions and 3-D data models may be stored on or encoded as one or more instructions or code on a computer-readable medium. Computer-readable media may include transitory or non-transitory computer storage media for carrying or having computer-executable instructions or data structures stored thereon. Both transitory and non-transitory storage media may be any available media that can be accessed by a computer as part of the processing system. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer. Further, when information is transferred or provided over a network or another communications connection (either hardwired, wireless, or combination thereof) to a computer, the computer or processing system properly determines the connection as a transitory or non-transitory computer-readable medium, depending on the particular medium. Thus, any such connection is properly termed a computer-readable medium. Combinations of the above should also be included within the scope of the computer-readable media. Non-transitory computer-readable media excludes signals per se and the air interface.

In the interest of clarity, not all of the routine features of the exemplary aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other techniques for composite inlay of materials. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. A system for manufacturing a composite structure, the system comprising:
    a plurality of flexible plates interlocked to each other to form a tooling surface for forming a composite structure to be manufactured;
    a plurality of actuators coupled to the plurality of flexible plates and configured to move the plurality of flexible plates relative to each other to adjust a contour of the tooling surface to correspond to a design contour of the composite structure to be manufactured; and
    a plurality of channels extending through at least a portion of the plurality of interlocked plates.

2. The system according to claim 1, further comprising a composite material applicator configured to apply a composite material to the tooling surface defined by the adjusted plurality of interlocked plates.

3. The system according to claim 2, further comprising a heater configured to cure the composite material to form the manufactured composite structure.

4. The system according to claim 3, timber comprising:
    a temperature sensor configured to monitor a temperature in at least one of the plurality of interlocked plates; and
    a heater control configured to adjust the thermal load resulting from curing of the composite material to prevent deformation of the defined tooling surface.

5. The system according to claim 1, further comprising a flexible layer disposed on the tooling surface of the plurality of interlocked plates and configured to remove surface deviations for the tooling surface.

6. The system according to claim 5, wherein the flexible layer comprises at least one of silicone and rubber.

7. The system according to claim 1, wherein the plurality of interlocked plates each comprise a flexible support structure.

8. The system according to claim 7, wherein at least one of the plurality of interlocked plates comprises a vacuum bag connector extending from the flexible support structure.

9. The system according to claim 8, further comprising a vacuum bag configured to be attached to the vacuum bag connector, such that the manufactured composite structure is vacuum sealed in the vacuum bag.

10. The system according to claim 1, wherein the plurality of actuators are configured to be adjusted to define a plurality of design contours for one or more composite structures to be manufactured.

11. The system according to claim 1, further comprising a pump configured to pump a water-soluble solution into the plurality of channels to hold the respective interlocked plates in a position for the tooling surface when the water-soluble solution hardens.

12. The system according to claim 1, further comprising a rinsing mechanism configured to flush the plurality of channels to remove the water-soluble solution to render movable the respective interlocked plates.

13. The system according to claim 1, further comprising an electronic memory configured to store the design contour for at least one surface of the composite structure to be manufactured.

14. The system according to claim 13, further comprising:
a three-dimensional scanner configured to scan of the defined tooling surface to compare a result of the three-dimensional scanning with the design contour stored in the electronic memory; and
a controller configured to adjust a position of at least one of the plurality of actuators to conform the defined tooling surface to the design contour stored in the electronic memory.

15. The system according to claim 1, wherein at least at least one of the plurality of interlocked plates is configured to be incorporated in a layup of the manufactured composite structure.

16. The system according to claim 1, wherein the plurality of actuators extend in a vertical direction from a base with the plurality of plates coupled to the plurality of actuators above the base.

17. The system according to claim 16, further comprising a controller configured to adjust the plurality of actuators by moving at least one of the plurality of adjustors up or down in the vertical direction to adjust the contour of the tooling surface.

18. The system according to claim 1, wherein each of the plurality of actuators is coupled to a respective flexible plate of the plurality of interlocked flexible plates.

* * * * *